United States Patent
Hur et al.

(10) Patent No.: US 7,990,481 B2
(45) Date of Patent: Aug. 2, 2011

(54) DISPLAY DEVICE HAVING PARTICULAR TOUCH SENSOR PROTRUSION FACING SENSING ELECTRODE

(75) Inventors: Seung-Hyun Hur, Cheonan-si (KR); Kweon-Sam Hong, Seoul (KR); Yeo Geon Yoon, Asan-si (KR); Dong-Wuuk Seo, Cheonan-si (KR); Jun-Hyup Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 11/924,098

(22) Filed: Oct. 25, 2007

(65) Prior Publication Data
US 2008/0100590 A1 May 1, 2008

(30) Foreign Application Priority Data

Oct. 30, 2006 (KR) .................. 10-2006-0105470
Jul. 25, 2007 (KR) .................. 10-2007-0074546

(51) Int. Cl.
*G02F 1/1335* (2006.01)
*G09F 3/041* (2006.01)
(52) U.S. Cl. ...................... 349/12; 345/173; 977/742
(58) Field of Classification Search .............. 349/12; 345/173; 977/742
See application file for complete search history.

(56) References Cited

U.S. PATENT DOCUMENTS

| 5,203,974 A * | 4/1993 | Kokado et al. ............ 204/489 |
| 2009/0002312 A1* | 1/2009 | Son ............................ 345/104 |
| 2009/0231497 A1* | 9/2009 | Takahashi et al. .......... 349/1 |

FOREIGN PATENT DOCUMENTS

| JP | 64-052353 | 2/1989 |
| JP | 03-068925 | 3/1991 |
| JP | 2000-187230 | 7/2000 |
| JP | 2000-298549 | 10/2000 |
| KR | 1020030054818 | 7/2003 |
| KR | 1020030055924 | 7/2003 |
| KR | 1020040093038 | 11/2004 |
| KR | 1020040106447 | 12/2004 |
| KR | 1020060001408 | 1/2006 |
| KR | 1020060063162 | 6/2006 |

* cited by examiner

*Primary Examiner* — Mike Qi
(74) *Attorney, Agent, or Firm* — H.C. Park & Associates, PLC

(57) ABSTRACT

The present invention relates to a display device. A display device according to an exemplary embodiment of the present invention includes a first substrate, a second substrate facing the first substrate, a sensing electrode disposed on the first substrate or the second substrate, and at least one touch sensor protrusion facing the sensing electrode. The touch sensor protrusion includes an organic material and carbon nanotubes.

24 Claims, 9 Drawing Sheets

DISPLAY DEVICE HAVING PARTICULAR TOUCH SENSOR PROTRUSION FACING SENSING ELECTRODE

CROSS-REFERENCE TO RELATED APPLICATIONS

This application claims priority from and the benefit of Korean Patent Application No. 10-2006-00105470, filed on Oct. 30, 2006, and Korean Patent Application No. 10-2007-0074546, filed on Jul. 25, 2007, which are hereby incorporated by reference for all purposes as if fully set forth herein.

BACKGROUND OF THE INVENTION

1. Field of the Invention

The present invention relates to a display device.

2. Discussion of the Background

A liquid crystal display (LCD) is one of the most widely used flat panel displays. An LCD includes two display panels that each have field-generating electrodes, such as pixel electrodes and a common electrode, and a liquid crystal (LC) layer interposed therebetween. The LCD induces an electric field on the LC layer by applying a voltage to the field-generating electrodes. The electric field determines the alignment of LC molecules in the LC layer to control the transmittance of incident light, thereby displaying an image.

Recently, a touch screen panel has been combined with a thin liquid crystal display, which is lightweight and small.

A touch screen panel is an apparatus on which characters may be drawn or written when a finger or touch pen touches the screen, and it performs a desired command on a machine, such as a computer, by operating icons. The liquid crystal display having a touch screen panel can detect whether or not a user's finger or touch pen touches the screen and can determine touch position information.

Among touch screen panels, an inner-type touch screen panel, in which the functions of the touch screen panel are attached onto the inner of the liquid crystal panel, is widely used since it can provide a high contrast ratio and a thin film type LCD that is lightweight, small, and low cost.

There are several kinds of inner-type touch screen panels including optical-type, ultrasonic-wave type, electrostatic capacitance-type, resistive-type, etc. The resistive-type touch screen panel has good characteristics against vibration, external light, and impact, may be manufactured easily, and provides a thin film type LCD that is lightweight and small. Therefore, resistive-type touch screen panels are widely used.

However, in a resistive-type touch screen panel, the touch sensor portion that determines contact by an externally applied pressure may be easily damaged.

SUMMARY OF THE INVENTION

The present invention provides a display device that may be resistant to damage caused by a delamination phenomenon generated by the external pressure in a touch sensor portion and a common electrode formed thereon.

Additional features of the invention will be set forth in the description which follows, and in part will be apparent from the description, or may be learned by practice of the invention.

The present invention discloses a display device including a first substrate, a second substrate facing the first substrate, a sensing electrode disposed on the first substrate or the second substrate, and at least one touch sensor protrusion facing the sensing electrode. The touch sensor protrusion includes organic material and carbon nanotubes.

The present invention also discloses a display device including a first substrate, a second substrate facing the first substrate, a sensing electrode disposed on the first substrate or the second substrate, and at least one touch sensor protrusion facing the sensing electrode. The touch sensor protrusion includes a conductive polymer material.

The present invention also discloses a display device including a first substrate, a sensing electrode disposed on the first substrate, a plurality of pixel electrodes disposed on the first substrate, a second substrate facing the first substrate, at least one touch sensor protrusion disposed on the second substrate and protruding toward the sensing electrode, a common electrode covering the touch sensor protrusion, and at least one spacer supporting the first substrate and the second substrate. The common electrode includes a conductive organic layer.

The present invention also discloses a display device including a first substrate, a sensing electrode disposed on the first substrate, a plurality of pixel electrodes disposed on the first substrate, a second substrate facing the first substrate, at least one touch sensor protrusion disposed on the second substrate and protruding toward the sensing electrode, an adhesion layer disposed on the touch sensor protrusion, a common electrode disposed on the adhesion layer, and at least one spacer supporting the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
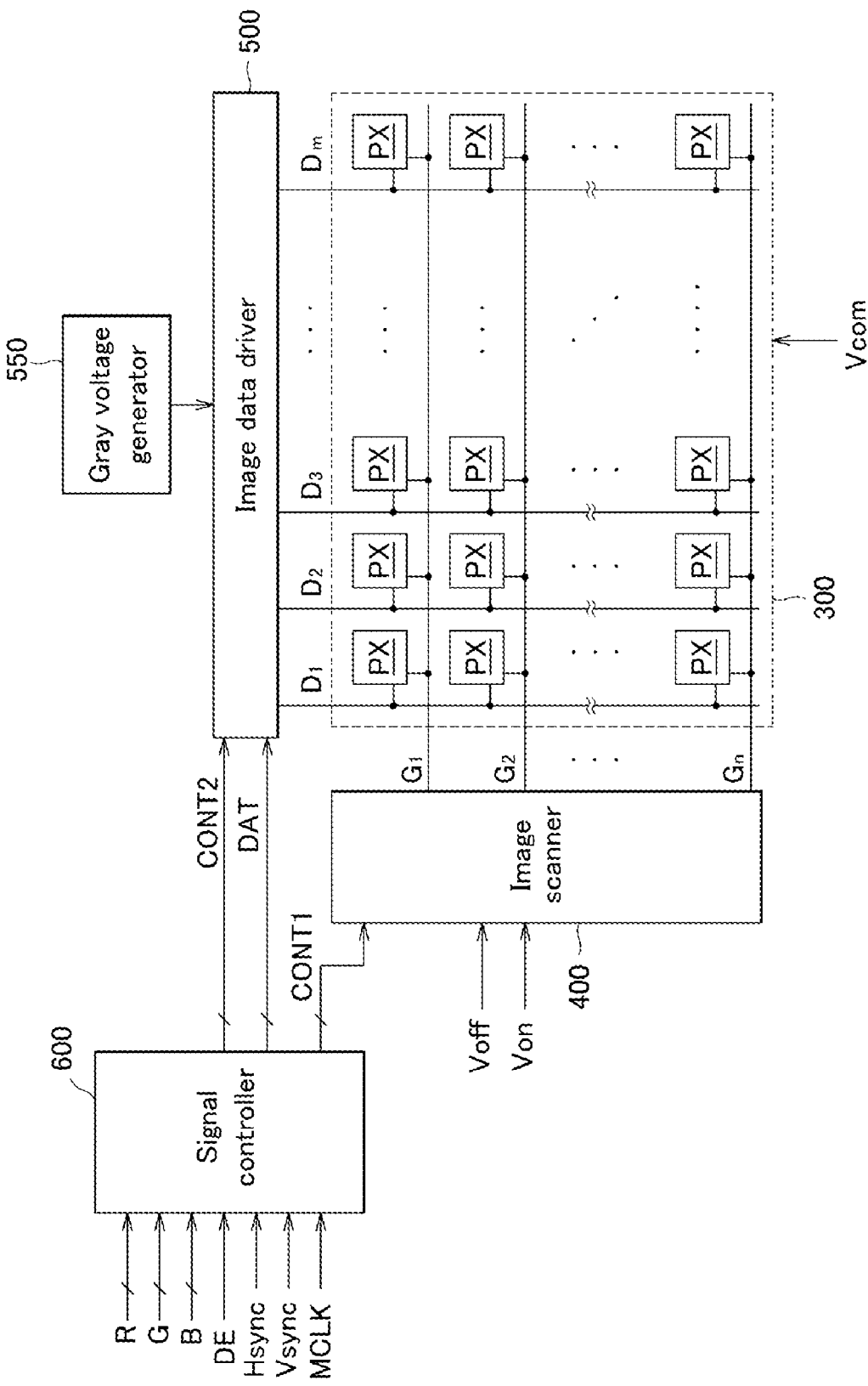
FIG. 1 is a block diagram of an LCD according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understand that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

An LCD according to an exemplary embodiment of the present invention will be described in detail below.

Exemplary Embodiment 1

Figure 3:
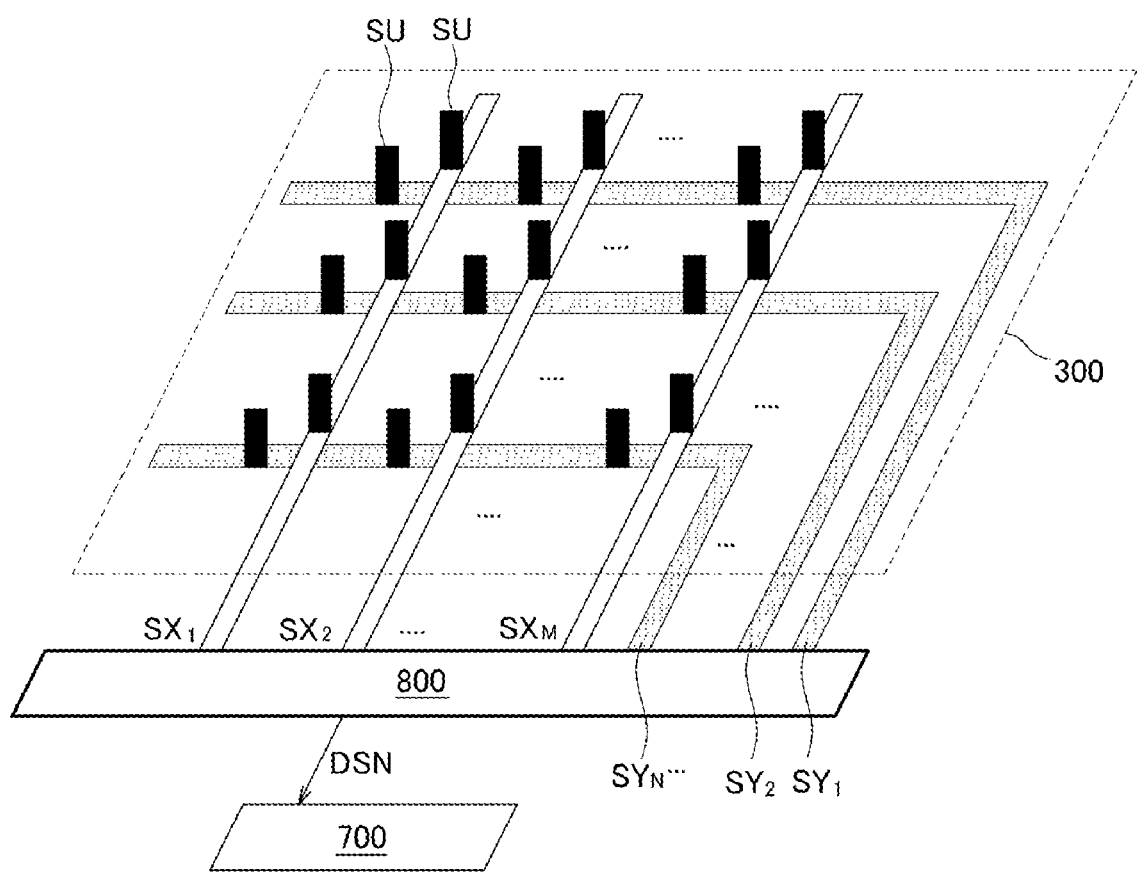
FIG. 3 is a block diagram of an LCD according to an exemplary embodiment of the present invention from the standpoint of a contact sensor.

Referring to FIG. 1 and FIG. 3, an LCD according to an exemplary embodiment of the present invention includes a liquid crystal panel assembly 300 and an image scanner 400 connected to the assembly, an image data driver 500, a sensing signal processor 800, a gray voltage generator 550 connected to the image data driver 500, a touch determining unit 700 connected to the sensing signal processor 800, and a signal controller 600. The signal controller 600 controls the liquid crystal panel assembly 300, the image scanner 400, the image data driver 500, the gray voltage generator 550, the touch determining unit 700, and the sensing signal processor 800.

The signal controller 600 is supplied with input image signals R, G, and B and input control signals for controlling the display thereof from an external graphics controller (not shown).

The input image signals R, G, and B include luminance information of each pixel PX, and luminance includes a determined number of gray levels, e.g., 1024 (=210), 256 (=28), or 64 (=26) gray levels.

The input control signals include a vertical synchronization signal Vsync, a horizontal synchronization signal Hsync, a main clock signal MCLK, and a data enable signal DE.

On the basis of the input control signals and the input image signals R, G, and B, the signal controller 600 generates gate control signals CONT1 and data control signals CONT2 and processes the image signals R, G, and B to be suitable for the operation of the panel assembly 300. The signal controller 600 sends the gate control signals CONT1 to the gate driver 400 and sends the processed image signals DAT and the data control signals CONT2 to the data driver 500.

Output image signals DAT are digital signals, and they have a predetermined number of values (or gray scales).

Figure 2:
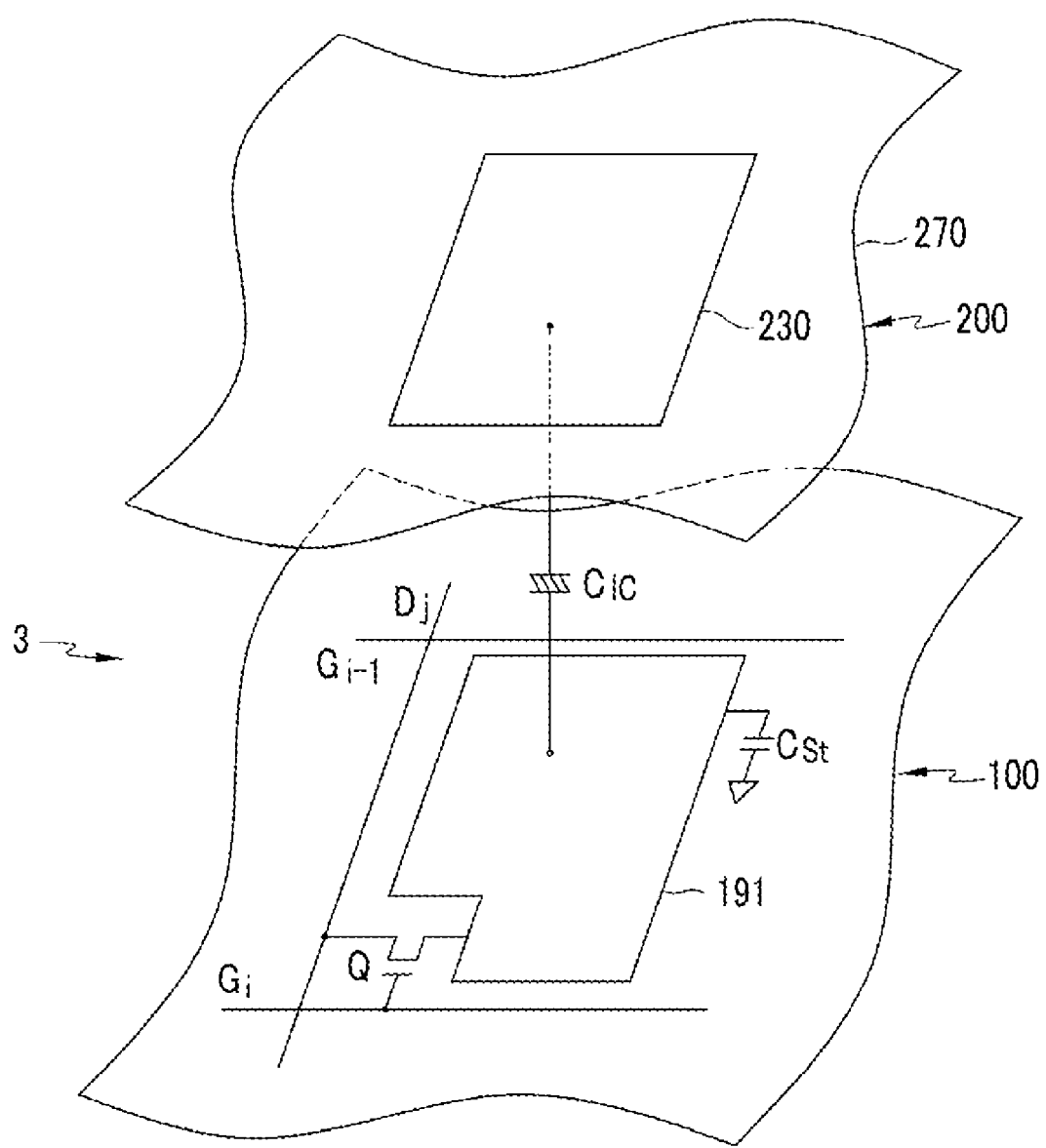
FIG. 2 is an equivalent circuit diagram showing a pixel of an LCD according to an exemplary embodiment of the present invention.

Referring to FIG. 1, FIG. 2, FIG. 3, and FIG. 4, the liquid crystal panel assembly 300 includes a plurality of display signal lines $G_1$-$G_n$ and $D_1$-$D_m$, a plurality of pixels PX connected to the display signal lines $G_1$-$G_n$ and $D_1$-$D_m$ and arranged in a matrix, a plurality of sensing signal lines $SY_1$-$SY_N$, $SX_1$-$SX_M$, and a plurality of sensors SU connected to the sensing signal lines $SY_1$-$SY_N$, $SX_1$-$SX_M$ and arranged in a matrix. Referring to FIG. 2, the liquid crystal panel assembly 300 includes a thin film transistor array panel 100 and a common electrode panel 200 facing each other, a liquid crystal layer 3 therebetween, and a spacer (not shown) that forms a gap between the two display panels 100 and 200 and is compressible.

The display signal lines $G_1$-$G_n$ and $D_1$-$D_m$ include a plurality of image scanning lines $G_1$-$G_n$ to transmit an image scanning signal and a plurality of image data lines $D_1$-$D_m$ to transmit an image data signal. The sensing signal lines $SY_1$-$SY_N$, $SX_1$-$SX_M$ include a plurality of horizontal sensing lines $SY_1$-$SY_N$ and a plurality of vertical sensing lines $SX_1$-$SX_M$ to transmit a sensing signal.

The image scanning lines $G_1$-$G_n$ and the horizontal sensing lines $SY_1$-$SY_N$ extend in the row direction and are parallel to each other. The image data lines $D_1$-$D_m$ and the vertical sensing lines $SX_1$-$SX_M$ extend in the column direction and are parallel to each other. The sensors SU may be formed on the circumferences of the portions where the horizontal sensing lines $SY_1$-$SY_N$ cross the vertical sensing lines $SX_1$-$SX_M$.

Each pixel PX, for example a pixel PX connected to an $i^{th}$ gate line $G_i$ (i=1, 2, . . . , n) and a $j^{th}$ data line $D_j$ (j=1, 2, . . . m), includes a switching element Q connected to the signal lines $G_i$ and $D_j$, and a liquid crystal capacitor $C_{lc}$ and a storage capacitor $C_{st}$ connected to the switching element Q. The storage capacitor $C_{st}$ may be omitted if necessary.

The switching element Q may be a three terminal element, such as a thin film transistor, provided in the thin film transistor array panel 100. The control terminal of the switching element Q is connected to one of the image scanning lines $G_1$-$G_n$, the input terminal of the switching element Q is connected to one of the image data lines $D_1$-$D_m$, and the output terminal of the switching element is connected to the liquid crystal capacitor $C_{lc}$ and the storage capacitor $C_{st}$. The thin film transistor may include amorphous silicon or polysilicon.

The pixel electrode 191 of the thin film transistor array panel 100 and a common electrode 270 of the common electrode panel 200 are the terminals of the liquid crystal capacitor $C_{lc}$, and the liquid crystal layer 3 between the two electrodes 191 and 270 acts as a dielectric material. The pixel electrode 191 is connected to the switching element Q, while the common electrode 270 is disposed on the front surface of the common electrode panel 200 and receives a common voltage Vcom. The storage capacitor $C_{st}$ acts as an auxiliary of the liquid crystal capacitor $C_{lc}$ and includes an additional signal line (not shown) provided on the thin film transistor array panel 100 and a pixel electrode 191, while overlapping an intervening insulator. A predetermined voltage, such as a common voltage Vcom, is applied to the additional signal line. However, the storage capacitor $C_{st}$ can be formed by overlapping the pixel electrode 191 with an image scanning line that overlaps with the pixel electrode with an insulator therebetween.

In order to implement color display, each pixel PX may uniquely display one of three primary colors (spatial division) or each pixel PX may sequentially display the primary colors in turn (temporal division) such that the spatial or temporal sum of the primary colors is recognized as a desired color. An example of a set of the primary colors includes red, green, and blue. FIG. 2 shows an example of the spatial division in which each pixel PX includes a color filter 230 representing one of the primary colors in a region of the common electrode panel 200 corresponding to the pixel electrode 191. Alternatively, the color filter 230 may be formed above or below the pixel electrode 191 of the thin film transistor array panel 100.

At least one polarizer (not shown) that polarizes the light may be adhered on the outer surface of the liquid crystal panel assembly 300.

The sensors SU may be disposed inside pixels, in the region between the pixels, or in a separate region outside of the pixels.

Figure 4:
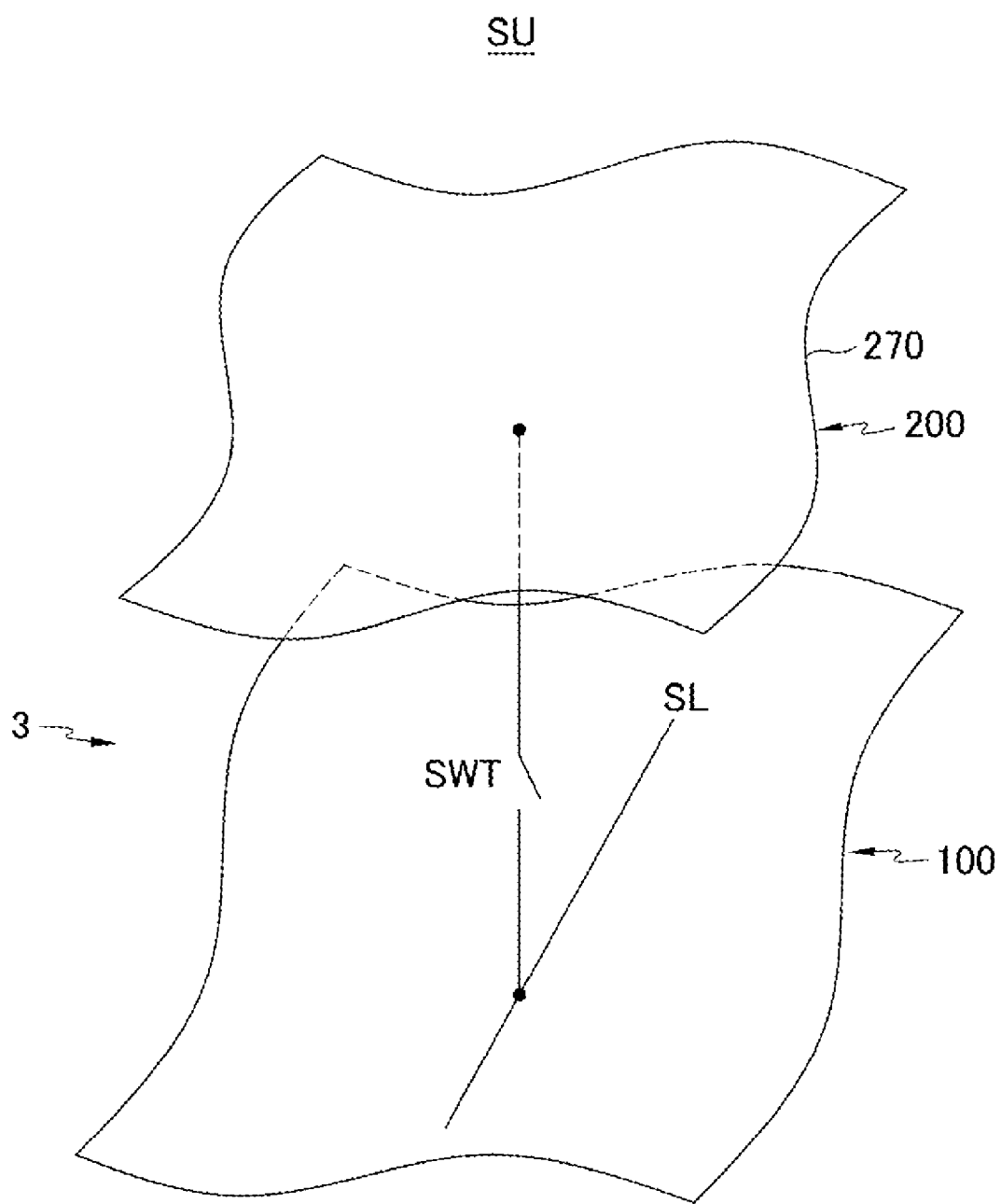
FIG. 4 is an equivalent circuit diagram showing a touch sensor of an LCD according to an exemplary embodiment of the present invention.

The sensor SU may have the structure shown in FIG. 4.

As shown in FIG. 4, the sensor SU is a touch sensor including a switch SWT connected to the horizontal or vertical sensing line (hereinafter referred to as "sensing line") represented as reference numeral SL.

The sensing line SL of the thin film transistor array panel 100 and the common electrode 270 of the common electrode panel 200 are the terminals of the switch SWT, and at least one of the two terminals protrudes such that the two terminals are physically and electrically connected to each other when exposed to external pressure (i.e. contact by the user). Accordingly, the common voltage Vcom from the common electrode 270 is output to the sensing line SL as a sensing data signal.

Therefore, by analyzing a sense data signal flowing through the horizontal sense lines $SY_1$-$SY_N$, the Y coordinate of a contact point can be determined, and by analyzing a sense data signal flowing through the vertical sense lines $SX_1$-$SX_M$, the X coordinate of the contact point can be determined.

The sensor SU is disposed between two adjacent pixels PX. The density of a pair of sensors SU connected to the horizontal and vertical sensing data lines $SY_1$-$SY_N$ and $SX_1$-$SX_M$ and adjacently disposed in the region where the two sensing data lines cross can be, for example, approximately ¼ of the density of a dot. Here, a dot, which is a basic unit for representing the resolution of the LCD, includes a set of three pixels PX arranged parallel to each other and each representing one of the three primary colors, such as red, green, and blue, respectively. However, one dot may include four or more pixels PX, and in this case each pixel PX may display one of the three primary colors or white.

In this case, some pixel rows and some pixel columns may not include a sensor SU.

The LCD having the touch sensor SU density and the dot density as described above may be applied to a field of precision such as character recognition. The resolution of the touch sensor SU may be increased or decreased as necessary.

Referring again to FIG. 1 and FIG. 3, the gray voltage generator 550 generates two sets of gray voltages (or reference gray voltages) relating to the transmittance of a pixel. One of the two sets has a positive value with respect to the common voltage Vcom, while the other has a negative value.

The image scanner 400 applies the image scanning signal to the image scanning lines $G_1$-$G_n$, wherein the image scanning signal includes the combination of a gate-on voltage Von that turns on the switching element Q and a gate-off voltage Voff that turns off the switching element Q when the gate-on voltage Von and the gate-off voltage Voff are provided to the image scanning lines $G_1$-$G_n$ of the liquid crystal panel assembly 300.

The image data driver 500 is connected to the image data lines $D_1$-$D_m$ of the liquid crystal panel assembly 300 and selects a gray voltage from the gray voltage generator 550 to be applied to the image data lines $D_1$-$D_m$ as an image data signal. However, when the gray voltage generator 550 does not provide the voltages of all gray scales, but provides only a predetermined number of reference gray voltages, the image data driver 500 may divide the reference gray voltages to generate gray voltages for all gray scales, and selects the image data signal from among them.

The sensing signal processor 800 is connected to the sensing signal lines $SY_1$-$SY_N$, $SX_1$-$SX_M$ of the liquid crystal panel assembly 300 and receives the sensing signals transmitted through the sensing signal lines $SY_1$-$SY_N$, $SX_1$-$SX_M$ to perform signal processing and generate a digital sensing signal DSN.

The touch determining unit 700 may include a central processing unit (CPU) and receives the digital sensing signal DSN from the sensing signal processor 800 and determines the touch of the touch sensor SU and the touch position.

Elements 400, 500, 550, 600, 700, and 800 can be directly mounted on the liquid crystal panel assembly 300 in the form of at least one IC chip, can be mounted on a flexible printed circuit (FPC) film (not shown) by adhering to the liquid crystal panel assembly 300 in the form of the tape carrier package (TCP), or can be mounted on an additional printed circuit board (PCB) (not shown). On the other hand, elements 400, 500, 550, 600, 700, and 800 can be integrated in the liquid crystal panel assembly 300 with the signal lines $G_1$-$G_n$, $D_1$-$D_m$, $SY_1$-$SY_N$, and $SX_1$-$SX_M$ and the thin film transistor Q.

Now, the structure of the touch sensor will be described with reference to FIG. 5, and the change of the electrical conductivity according to a content of carbon nanotubes, which may be one of the materials composing the touch sensor, will be described with the reference to FIG. 6 in detail.

Figure 5:
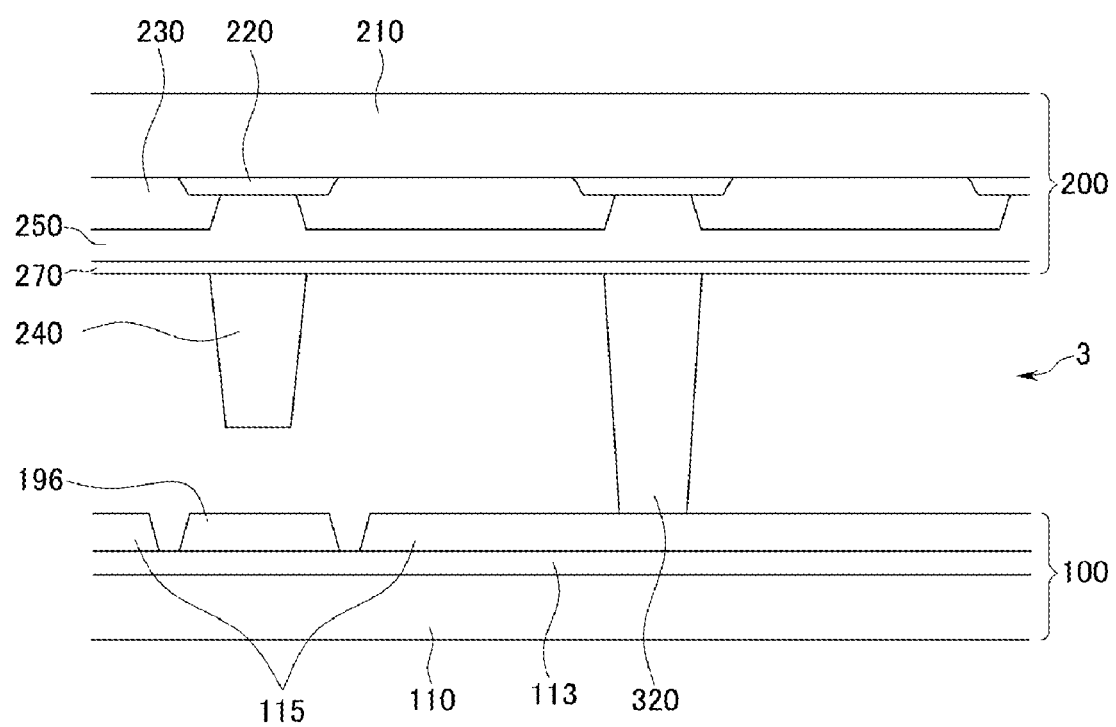
FIG. 5 is a schematic cross-sectional view of a touch sensor of an LCD according to first and second exemplary embodiments of the present invention.
Figure 6:
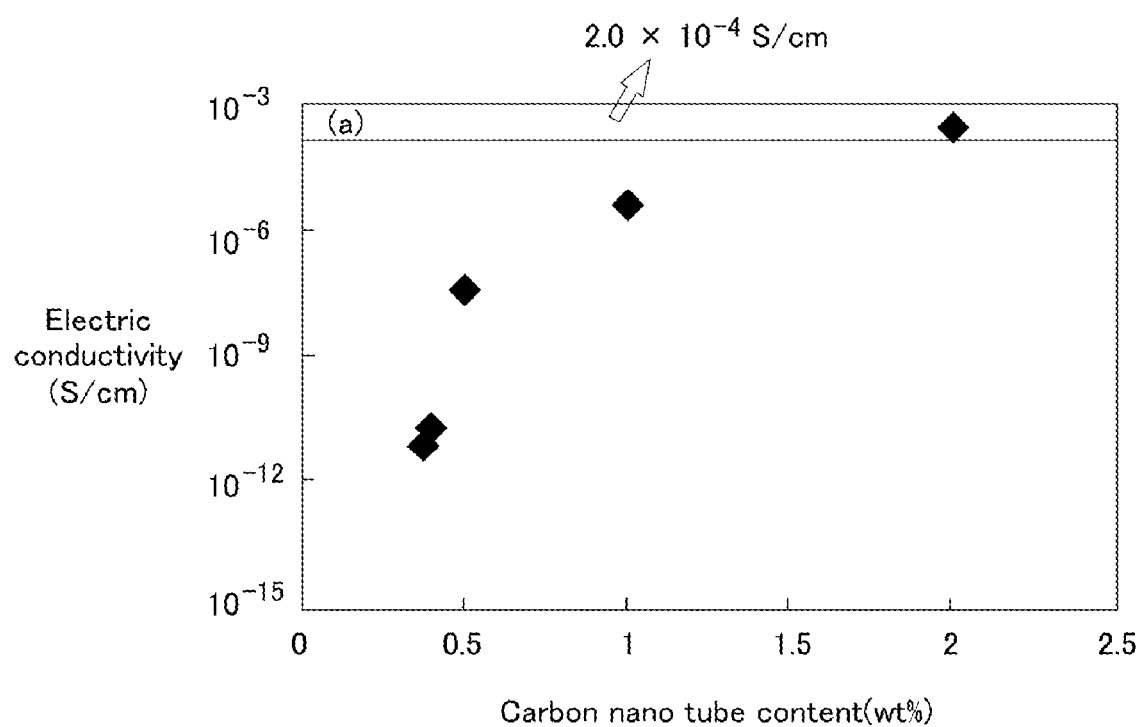
FIG. 6 is a graph showing electrical conductivity according to content of carbon nanotubes in a composite of carbon nanotubes and an organic material constituting a protrusion for a touch sensor of an LCD according to an exemplary embodiment of the present invention.

FIG. 5 is a schematic cross-sectional view of a touch sensor of an LCD according to a first exemplary embodiment of the present invention.

As shown in FIG. 5, an LCD according to the present exemplary embodiment includes a thin film transistor array panel 100, a common electrode panel 200 facing the thin film transistor array panel 100, and a liquid crystal layer 3 disposed therebetween.

A sensing electrode 196 is disposed on an insulating substrate 110 that may be made of transparent glass or plastic in the lower panel 100. A passivation layer 113 is disposed under the sensing electrode 196, and the passivation layer 113 may be made of an organic material. A transparent conductive layer 115 is disposed on the passivation layer 113, and the sensing electrode 196 may be made of the same material as the transparent conductive layer 115.

A pixel electrode may include the transparent conductive layer 115.

In the upper panel 200 facing the lower panel 100, a light blocking member 220 is disposed on an insulating substrate 210 that may be made of transparent glass or plastic. The light blocking member 220 is also called a black matrix and prevents light leakage between the pixels.

A plurality of color filters 230 are also disposed on the substrate 210 and the light blocking member 220, and the color filters 230 are mostly positioned inside a region surrounded by the light blocking member 220. The color filters 230 may be stripe-shaped and may extend in a vertical direction along the column of pixels. Each color filter 230 may display one of the primary colors, i.e., red, green, or blue.

A transparent passivation layer 250 is disposed on the light blocking member 220, and the color filters 230. The transparent passivation layer 250 protects the color filters 230 and prevents the color filters 230 from being exposed.

A common electrode 270 is formed on the transparent passivation layer 250. The common electrode 270 may be made of a transparent conductor such as indium tin oxide (ITO), indium zinc oxide (IZO), or the like, and the conductor for the common electrode 270 is deposited and may be patterned to form a desired shape. The common electrode 270 receives a common voltage Vcom.

A plurality of touch protrusions 240, which may be made of a composite including an organic material and carbon nanotubes, are formed on the common electrode 270.

In this exemplary embodiment of the present invention, an epoxy resin and an acryl monomer are used as the organic material for forming the touch sensor protrusions 240.

A composite including this organic material and carbon nanotubes may be used as the material for forming the touch sensor protrusions 240.

The length of the carbon nanotubes may be in the range of several nm to several tens of μm, and if the concentration of the carbon nanotubes in the polymer is more than a particular concentration, the electrical conductivities of the carbon nanotubes are combined forming conductivity as that of metal. Referring to FIG. 6, if the content of the carbon nanotubes is more than 2 wt %, an electrical conductivity (a) of $2.0 \times 10^{-4}$ S/cm, which is in the degree of ITO, can be obtained (referring to Physical Review B 72, 121404(R), 2005). Accordingly, when the carbon nanotubes are mixed into the organic material to form the composite and the content of the carbon nanotubes in the composite is in the range of from 0.1 to 20 wt % of the composite, more preferably from 1 to 5 wt %, the carbon nanotubes may function as a conductor to transmit a touch detection signal.

Also, because carbon nanotubes are flexible and have a breaking elongation rate of 20% (compared with ITO having a breaking elongation rate of 1%), cracking of the carbon nanotubes rarely occurs even when the carbon nanotubes are deformed. Thus, even when the carbon nanotubes are repeatedly touched and severely deformed, the conductivity may be maintained. For example, when comparing the resistance generation due to cracking of a polymer coated with a material including ITO with that of a polymer coated with a material including carbon nanotubes, the polymer coated with the material including carbon nanotubes has better durability such that increased resistance due to cracking is hardly detected. When expansion and contraction are executed more than 100 times, the resistance due to cracking of PET coated with a material including ITO increases, while the resistance due to cracking of the PET coated with the material including carbon nanotubes remains substantially the same. Also, research results showed that when the expansion and contraction are executed more than 1000 times, the resistance due to cracking of the PET coated with the material including ITO dramatically increases, while the resistance due to cracking of the PET coated with the material including carbon nanotubes remains substantially the same.

Furthermore, carbon nanotubes absorb impurities on their surfaces. Therefore, when the material of the touch sensor protrusions 240 includes carbon nanotubes, ion impurities in the liquid crystal layer may be absorbed on the surface of the carbon nanotubes such that the concentration of impurities in the liquid crystal layer decreases. Accordingly, line and surface afterimages may be reduced.

The touch sensor protrusions 240 are disposed to correspond to the sensing electrodes 196 of the sensing lines SL. Accordingly, the touch sensor protrusions 240 contact the sensing electrode 196 when subjected to external pressure, and the voltage of the common electrode 270 voltage is applied to the corresponding sensing line SL.

Further, a plurality of column spacers 320, which may be made of an organic material, are disposed on the common electrode 270. The column spacers 320 are uniformly dispersed in the liquid crystal panel assembly 300 and form a gap between the lower panel 100 and the upper panel 200. The column spacers 320 may be disposed on one of the upper panel 200 or the lower panel 100.

An alignment layer (not shown) may be coated on inner surfaces of the panels 100 and 200, and one or more polarizers (not shown) may be attached to the outer surface of the panels 100 and 200.

The liquid crystal display may further include a sealant (not shown) combining the lower panel 100 and the upper panel 200. The sealant is disposed on the edge of the upper panel 200.

A liquid crystal layer 3 is disposed between the lower panel 100 and the upper panel 200, and two display panels 100 and 200 are supported by the plurality of column spacers 320 such that the distance between the touch sensor protrusions 240 and the sensing electrode 196 is maintained absent external pressure.

The touch sensor protrusions 240 and the sensing electrode 196 form the switch SWT of the touch sensor.

In this liquid crystal display, if external pressure is applied to the upper panel 200, the touch sensor protrusions 240 corresponding to the portion of the upper panel 200 where the external pressure was applied are physically and electrically connected to the sensing electrode 196 of the lower panel 100. Accordingly, the common voltage Vcom from the common electrode 270 is transmitted to the sensing electrode 196 of the touch sensor through the protrusions 240 of the touch sensor.

In the present exemplary embodiment, the protrusions 240 of the touch sensor are made of the composite including the organic material and the carbon nanotubes such that cracking or exfoliations generated by friction between the touch sensor protrusions 240 and the sensing electrode 196 due to the repeat application of pressure may be prevented.

Furthermore, the protrusions 240 may be disposed on any position of the upper panel 200 or the lower panel 100, and will now be described in detail according to the second exemplary embodiment.

Exemplary Embodiment 2

Because the elements explained with regard to FIG. 1, FIG. 2, FIG. 3, and FIG. 4 and the descriptions thereof are the same as that of the previous exemplary embodiment, a description of the same elements is omitted and only the elements that are different from the previous exemplary embodiment will be described in the current exemplary embodiment of the present invention.

FIG. 5 is a schematic cross-sectional view of a touch sensor of an LCD according to a second exemplary embodiment of the present invention.

In the LCD according to the second exemplary embodiment of the present invention, a plurality of touch sensor protrusions 240 are disposed on the common electrode 270. The protrusions 240 may be made of a conductive polymer material. For example, the conductive polymer material for forming the touch sensor protrusions 240 may be a material that adds poly (3,4-ethylenedioxythiophene) poly (styrenesulfonate) (PEDOT-PSS) as a transparent conductive polymer to a mixture material of an epoxy resin and an acryl monomer.

Exemplary Embodiment 3

Because the elements explained through FIG. 1, FIG. 2, FIG. 3, and FIG. 4 and the descriptions thereof are the same as that of the first exemplary embodiment, a description of the same elements is omitted and only the elements that are different from the first exemplary embodiment will be described in the current exemplary embodiment of the present invention.

Figure 7:
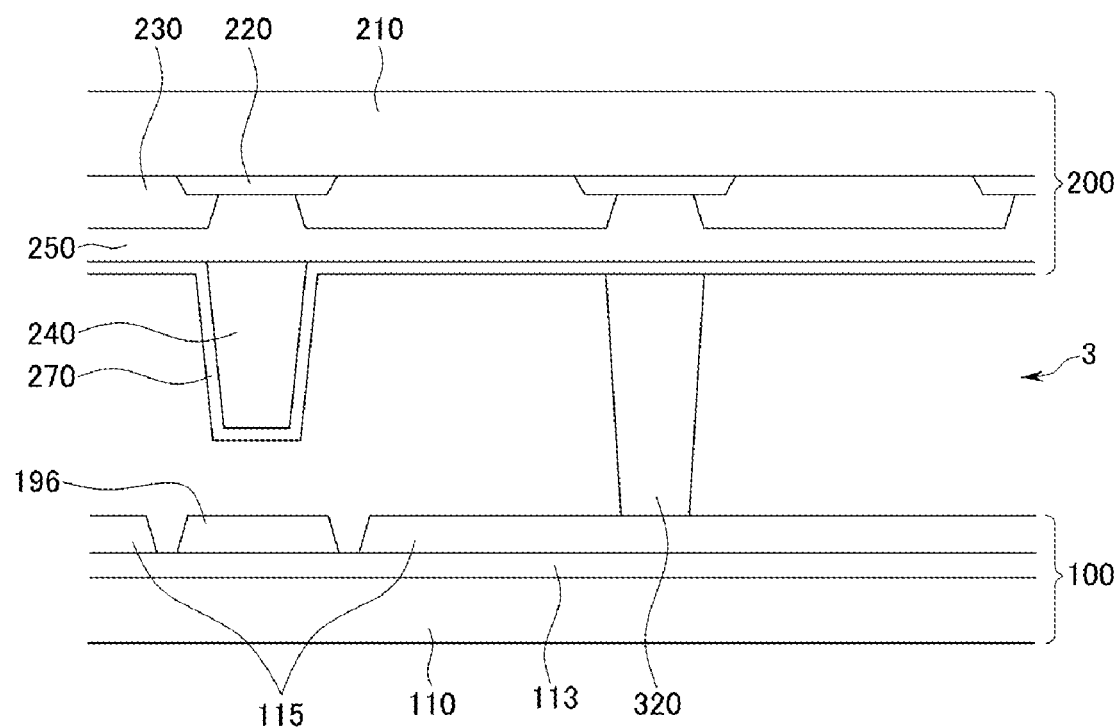
FIG. 7 is a schematic cross-sectional view of a touch sensor of an LCD according to third and fourth exemplary embodiments of the present invention.

FIG. 7 is a schematic cross-sectional view of a touch sensor of an LCD according to a third exemplary embodiment of the present invention.

In an LCD according to the third exemplary embodiment of the present invention, the common electrode 270 encloses the touch sensor protrusions 240 disposed on the transparent passivation layer 250, which is different from the previous exemplary embodiment in which the touch sensor protrusions 240 are formed directly on the common electrode 270.

The plurality of touch sensor protrusions 240 may be made of a composite including an organic material and carbon nanotubes.

In this exemplary embodiment of the present invention, the organic material for forming the touch sensor protrusions 240 uses an epoxy resin and an acryl monomer.

The material for forming the composite along with the organic material to form the touch sensor protrusions 240 may further include carbon nanotubes. The content of the carbon nanotubes in the composite may be in the range of 0.1 to 20 wt % of the composite including the carbon nanotubes and the organic material, and more preferably in the range of 1 to 5 wt %.

The touch sensor protrusions 240 correspond to the sensing electrodes 196 of the sensing lines SL, and the signal is applied to the sensing electrode 196 of the sensing line SL.

A common electrode 270 covering the touch sensor protrusions 240 is disposed on the transparent passivation layer 250. The common electrode 270 may be made of a transparent conductor such as ITO or IZO, and the conductor may be patterned to form a required shape after depositing the conductor. The common electrode 270 receives the common voltage Vcom.

In the LCD, if an external pressure is applied to the upper panel 200 the common electrode 270 covering the touch sensor protrusions 240 corresponding to the portion of the upper panel 200 to which the pressure is applied is physically and electrically connected to the sensing electrode 196 of the lower panel 100. Accordingly, the common voltage Vcom is applied to the sensing electrode 196, thereby generating a sensing current.

In the present exemplary embodiment, to improve adhesion between the sensor protrusions 240, which are made of the composite including the conductive organic material and carbon nanotubes, and the common electrode 270, the common electrode 270 is disposed to cover the touch sensor protrusions 240.

According to the current exemplary embodiment of the present invention, the touch sensor protrusions 240 may be prevented from separating from the common electrode 270.

Furthermore, even if cracking is generated between the touch sensor protrusions 240 and the common electrode 270, or cracking or exfoliation is generated by friction due to the pressure of the user on the contact portion with the sensing electrode 196 among the common electrode 270 covering the touch sensor protrusions 240, the signal may be easily applied because the touch sensor protrusions 240 have conductivity.

In the exemplary embodiment according to the present invention, the cracking or exfoliation generated by friction between the sensing electrode 196 and the common electrode 270 disposed on the touch sensor protrusions 240 by the application of the pressure may be prevented.

Exemplary Embodiment 4

Since the contents described through FIG. 1, FIG. 2, FIG. 3, and FIG. 4 and the descriptions thereof are the same as that of the previous exemplary embodiments, a description thereof is omitted and only the characteristics that are different from the previous exemplary embodiments will now be described in detail in the present exemplary embodiment.

FIG. 7 is a schematic cross-sectional view of a touch sensor of a liquid crystal display according to a fourth exemplary embodiment of the present invention.

In an LCD according to the fourth exemplary embodiment of the present invention, a common electrode 270 is disposed on the transparent passivation layer 250 on which the touch sensor protrusions 240 are disposed, like in the third exemplary embodiment. The common electrode 270 may be made of a conductive organic layer having good adhesion and may have a elastic coefficient to the touch sensor protrusions 240 that is similar to that of ITO.

The conductive organic layer for forming the common electrode 270 may use a material that adds poly (3,4-ethylenedioxythiophene) poly (styrenesulfonate) (PEDOT-PSS) as a transparent conductive polymer to a mixture material of an epoxy resin and an acryl monomer.

Exemplary Embodiment 5

Since the contents described through FIG. 1, FIG. 2, FIG. 3, and FIG. 4 and the descriptions thereof are the same as that of the previous exemplary embodiments, a description thereof is omitted and only the characteristics that are different from the previous exemplary embodiments will now be described in detail in the present exemplary embodiment.

Figure 8:
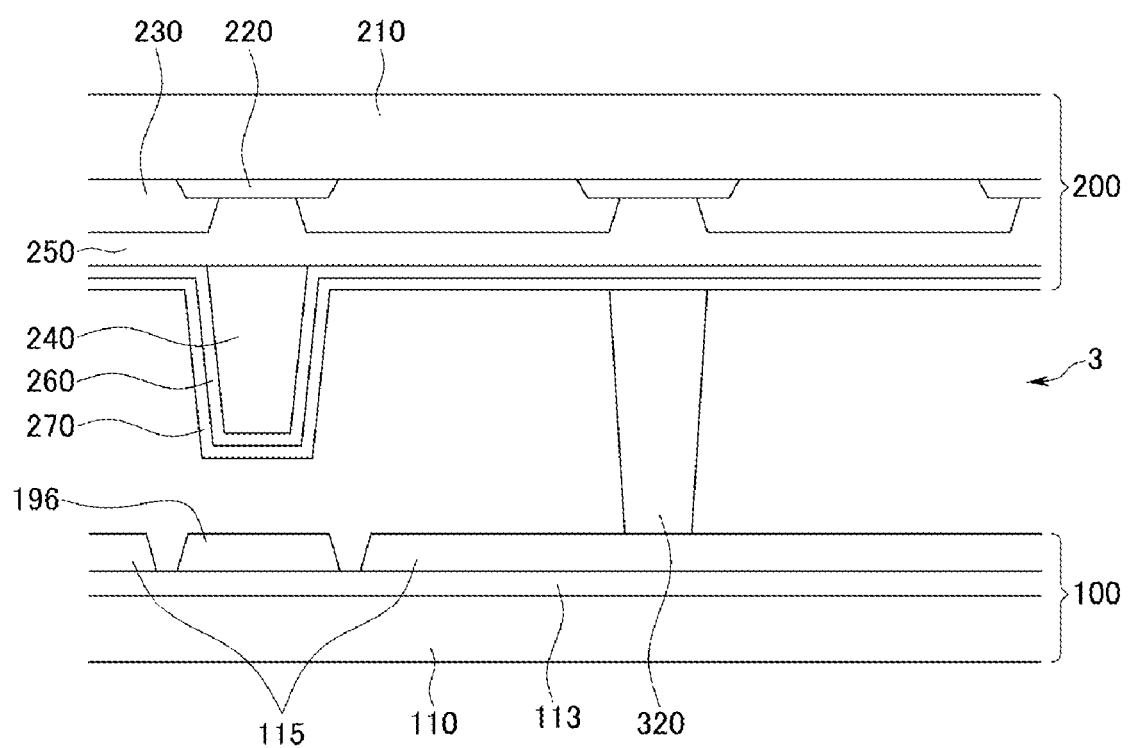
FIG. 8 is a schematic cross-sectional view of a touch sensor of an LCD according to a fifth exemplary embodiment of the present invention.

FIG. 8 is a schematic cross-sectional view of a touch sensor of an LCD according to a fifth exemplary embodiment of the present invention.

In the LCD according to the fifth exemplary embodiment of the present invention, an adhesion layer 260 is disposed on the transparent passivation layer 250 on which the touch sensor protrusions 240 are disposed to improve the adhesion between the touch sensor protrusions 240 and the common electrode 270, which are formed on the sensor protrusions 240.

Here, the adhesion layer 260 may be made of a transparent organic material having a higher elastic coefficient than the touch sensor protrusions 240 and a good adhesion force with the common electrode 270, or an inorganic material having a lower elastic coefficient than the common electrode 270 and a good adhesion force with the touch sensor protrusions 240. Accordingly, the adhesion layer 260 is disposed between the touch sensor protrusions 240 and the common electrode 270 such that cracking generated in the common electrode 270 disposed on the touch sensor protrusions 240 may be reduced and the delamination phenomenon generated between the touch sensor protrusions 240 and the common electrode 270 due to the pressure according to the touch of the user may be prevented.

Furthermore, the adhesive layer 260 may be made of an organic or inorganic material having conductivity. Like this, when the adhesive layer 260 is made of a material having conductivity, even if there is cracking in the common electrode 270 disposed on the touch sensor protrusions 240 due to the application of external pressure or delamination is generated between the touch sensor protrusions 240 and the common electrode 270, the signal may still be applied.

To form the adhesive layer 260, the conductive organic layer may be made of a material where poly (3,4-ethylenedioxythiophene) poly (styrenesulfonate) (PEDOT-PSS) as a transparent conductive polymer is mixed to a mixture of an epoxy resin and an acryl monomer.

The common electrode 270 may be disposed on the adhesive layer 260.

Exemplary Embodiment 6

Figure 9:
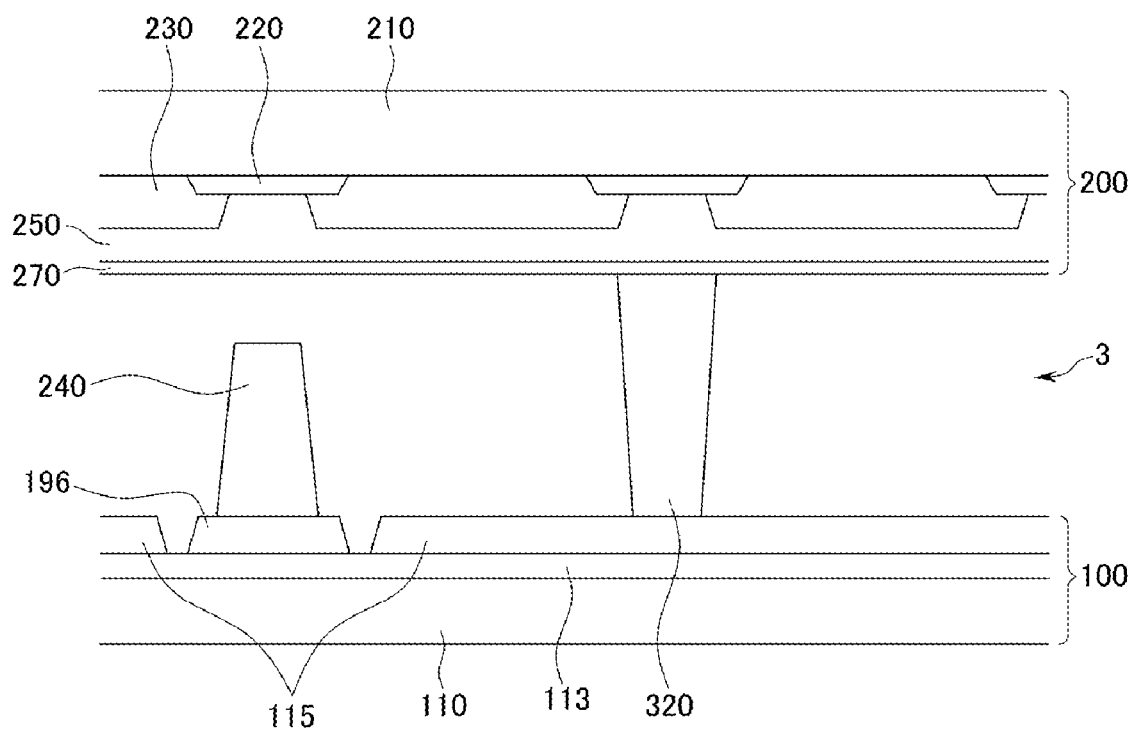
FIG. 9 is a schematic cross-sectional view of a touch sensor of an LCD according to a sixth exemplary embodiment of the present invention.

FIG. 9 is a schematic cross-sectional view of a touch sensor of an LCD according to a sixth exemplary embodiment of the present invention.

In an LCD according to the sixth exemplary embodiment of the present invention, a plurality of touch sensor protrusions 240 made of a composite including an organic material and carbon nanotubes are disposed on a sensing electrode 196 of a touch sensor in a lower panel 100, and a column spacer 320 is disposed on an upper panel 200. This is different from the first and second exemplary embodiments in which the touch sensor protrusions 240 are directly on the common electrode 270 and from the third and fourth exemplary embodiments in which the common electrode 270 covers the touch sensor protrusions 240 disposed on the transparent passivation layer 250.

The upper panel 200 includes the common electrode 270 disposed on the transparent passivation layer 250 and therefore, has the same as the structure of the first and second exemplary embodiments. The common electrode 270 may be made of a transparent conductor of ITO or IZO, and the conductor may be patterned to form a desired shape after being deposited. The common voltage Vcom is applied to the common electrode 270.

A plurality of touch sensor protrusions 240 made of a composite including an organic material and carbon nanotubes are disposed on the sensing electrode 196 of the touch sensor of the lower panel 100.

In this exemplary embodiment of the present invention, an organic material including an epoxy resin and an acryl monomer may be used to form the touch sensor protrusions 240.

Also, carbon nanotubes are used as a material to form the composite along with the organic material that forms the touch sensor protrusions 240. The content of the carbon nanotubes may be in the range of about 0.1 to 20 wt %, and more preferably in the range of about 1 to 5 wt %, in the composite including the organic material and carbon nanotubes.

The touch sensor protrusions 240 are directly disposed on the sensing electrode 196 of a sensing line SL and apply the signals to the sensing electrode 196 of the sensing line SL.

In this LCD, if external pressure is applied to the upper panel 200, the portion of the upper panel 200 to which the external pressure is applied is depressed such that the common electrode 270 is physically and electrically connected to the touch sensor protrusions 240 disposed on the sensing electrode 196 of the sensing line SL. Accordingly, the common voltage Vcom from the common electrode 270 is transmitted to the sensing electrode 196 through the touch sensor protrusions 240 and a sensing current is generated.

In the present exemplary embodiment, the touch sensor protrusions 240 may be made of a composite including an organic material and carbon nanotubes, such that the generation of cracking and delamination in the common electrode 270 disposed on the touch sensor protrusions 240 caused by the application of repeated pressure may be prevented.

Furthermore, the touch sensor protrusions 240 may include a conductive organic material, and the conductive organic material may be made of a material in which poly (3,4-ethylenedioxythiophene) poly (styrenesulfonate) (PEDOT-PSS) as a transparent conductive polymer is mixed to a mixture of an epoxy resin and an acryl monomer.

The LCD is not limited to the display device according to the exemplary embodiments of the present invention as described herein, and the present invention may be adapted to a display device such as a plasma display device or an organic light emitting device display.

Furthermore, the lower panel and the upper panel may be supported by a plurality of spacers in the exemplary embodiments of the present invention, but this is not limiting, and the two panels may instead be supported by bead spacers.

As above described, the touch sensor protrusions may be made of a composite including an organic material and carbon nanotubes, so that the generation of cracking and delamination in the layer enclosing the touch sensor protrusions according due to the repeated application of pressure to the sensing electrode of the lower panel may be prevented.

Also, the touch sensor protrusions may include an organic material and carbon nanotubes, and the common electrode may be disposed on the touch sensor protrusions. Accordingly, the generation of cracking or the delamination phenomenon between the touch sensor protrusions and the interface attached to the touch sensor protrusions may be reduced and even if cracking or delamination is generated between the sensing electrode and the common electrode enclosing the touch sensor protrusions, the sensing detection signal may still be applied.

Furthermore, the adhesion layer may be formed on the touch sensor protrusions to improve the adhesion between the touch sensor protrusions and the common electrode, or the common electrode may be disposed of a conductive organic layer such that the generation of the delamination phenomenon in the interface between the common electrode enclosing the touch sensor protrusions and the touch sensor protrusions may be prevented.

Furthermore, the touch sensor protrusions may be made of a polymer material such that the touch sensor protrusions are depressed and physically and electrically connected to the sensing electrode of the lower panel when external pressure is applied. Accordingly, the generation of the delamination phenomenon between the touch sensor protrusions and the layer enclosing the touch sensor protrusions and cracking in the layer enclosing the touch sensor protrusions may be prevented.

It will be apparent to those skilled in the art that various modifications and variations can be made in the present invention cover the modifications and variations of this invention provided they come within the scope of the appended claims and their equivalents.

What is claimed is:

1. A display device, comprising:
a first substrate;
a second substrate facing the first substrate;
a sensing electrode disposed on the first substrate or the second substrate; and
at least one touch sensor protrusion facing the sensing electrode,
wherein the touch sensor protrusion comprises an organic material and carbon nanotubes.

2. The display device of claim 1, further comprising:
a plurality of pixel electrodes disposed on the first substrate; and
a common electrode disposed on the second substrate.

3. The display device of claim 2, wherein the touch sensor protrusion is disposed on the common electrode.

4. The display device of claim 2, wherein the common electrode is disposed on the touch sensor protrusion.

5. The display device of claim 2, wherein the touch sensor protrusion is disposed on the sensing electrode and protrudes toward the common electrode.

6. The display device of claim 1, further comprising:
at least one spacer supporting the first substrate and the second substrate and arranged between the first substrate and the second substrate.

7. The display device of claim 1, wherein the organic material comprises an epoxy resin and an acryl monomer.

8. The display device of claim 1, wherein the touch sensor protrusion comprises about 0.1 to about 20 wt % carbon nanotubes.

9. The display device of claim 8, wherein the touch sensor protrusion comprises about 1 to about 5 wt % carbon nanotubes.

10. A display device, comprising:
a first substrate;
a second substrate facing the first substrate;
a sensing electrode disposed on the first substrate or the second substrate; and
at least one touch sensor protrusion facing the sensing electrode,
wherein the touch sensor protrusion comprises a conductive polymer material.

11. The display device of claim 10, further comprising:
a plurality of pixel electrodes disposed on the first substrate; and
a common electrode disposed on the second substrate.

12. The display device of claim 11, wherein the touch sensor protrusion is disposed on the common electrode.

13. The display device of claim 11, wherein the common electrode is disposed on the touch sensor protrusion.

14. The display device of claim 11, wherein the touch sensor protrusion is disposed on the sensing electrode and protrudes toward the common electrode.

15. The display device of claim 10, further comprising:
at least one spacer supporting the first substrate and the second substrate and arranged between the first substrate and the second substrate.

16. The display device of claim 10, wherein the conductive polymer material comprises an epoxy resin, an acryl monomer, and poly (3,4-ethylenedioxythiophene) poly (styrenesulfonate).

17. A display device, comprising:
a first substrate;
a sensing electrode disposed on the first substrate;
a plurality of pixel electrodes disposed on the first substrate;
a second substrate facing the first substrate;
at least one touch sensor protrusion disposed on the second substrate and protruding toward the sensing electrode;
a common electrode covering the touch sensor protrusion; and
at least one spacer supporting the first substrate and the second substrate,
wherein the common electrode comprises a conductive organic layer.

18. The display device of claim 17, wherein the common electrode comprises an epoxy resin, an acryl monomer, and poly (3,4-ethylenedioxythiophene) poly (styrenesulfonate).

19. A display device, comprising:
a first substrate;
a sensing electrode disposed on the first substrate;
a plurality of pixel electrodes disposed on the first substrate;
a second substrate facing the first substrate;
at least one touch sensor protrusion disposed on the second substrate and protruding toward the sensing electrode;
an adhesion layer disposed on the touch sensor protrusion;
a common electrode disposed on the adhesion layer; and
at least one spacer supporting the first substrate and the second substrate.

20. The display device of claim 19, wherein the adhesion layer comprises a transparent organic material having an elastic coefficient greater than the touch sensor protrusion.

21. The display device of claim 19, wherein the adhesion layer comprises an inorganic material having an elastic coefficient less than the common electrode.

22. The display device of claim 19, wherein the adhesion layer comprises an organic layer having conductivity.

23. The display device of claim 22, wherein the adhesion layer comprises an epoxy resin, an acryl monomer, and poly (3,4-ethylenedioxythiophene) poly (styrenesulfonate).

24. The display device of claim 19, wherein the adhesion layer comprises a conductive inorganic layer.

* * * * *